April 2, 1957   G. J. SYKOKIS   2,787,366
ENDLESS CHAIN CONVEYOR
Filed March 2, 1950   6 Sheets-Sheet 1

April 2, 1957 G. J. SYKOKIS 2,787,366
ENDLESS CHAIN CONVEYOR
Filed March 2, 1950 6 Sheets-Sheet 2
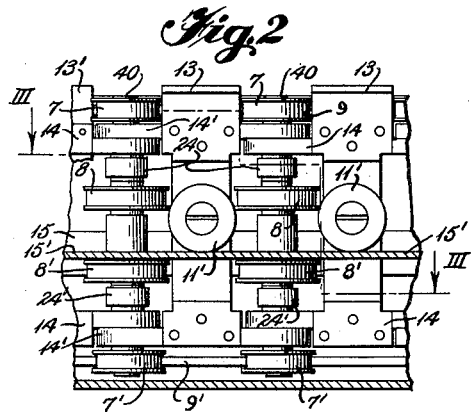
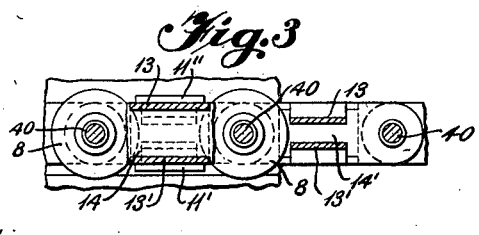
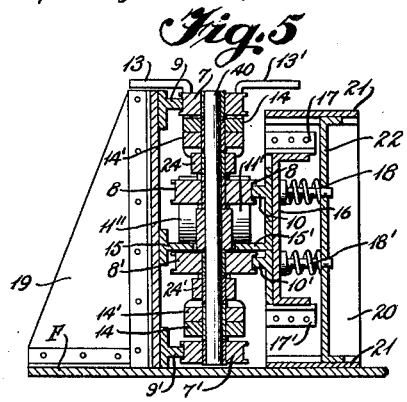
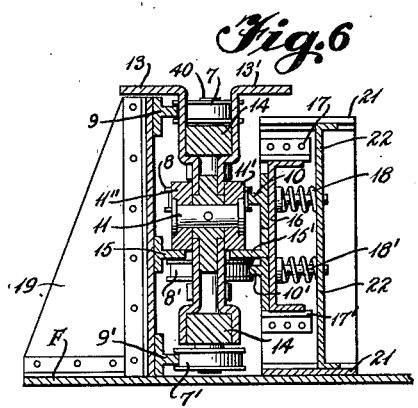
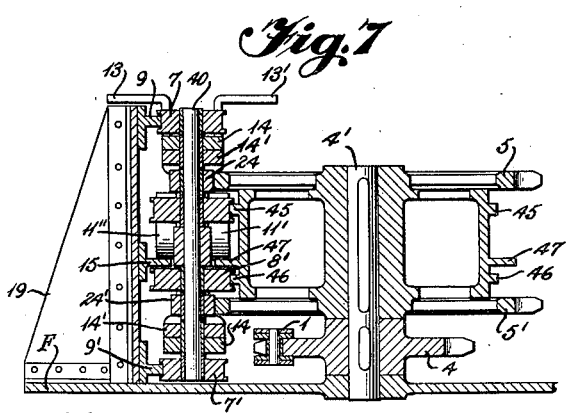
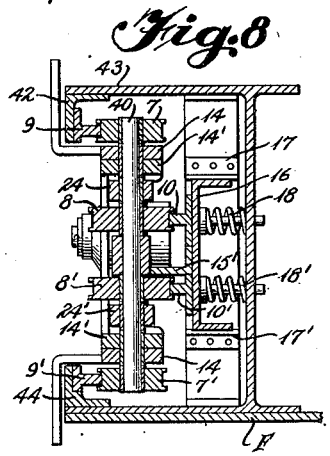
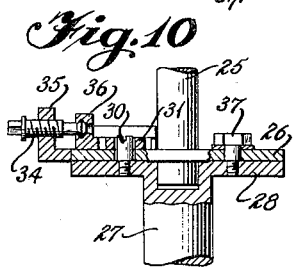
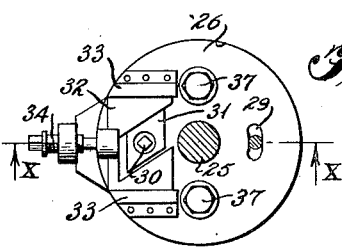

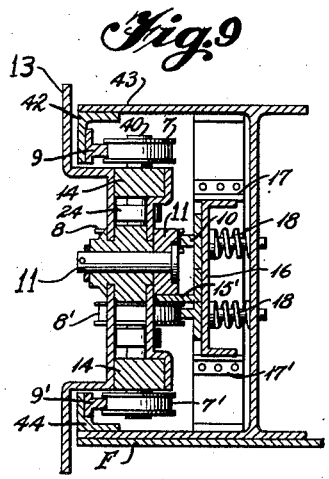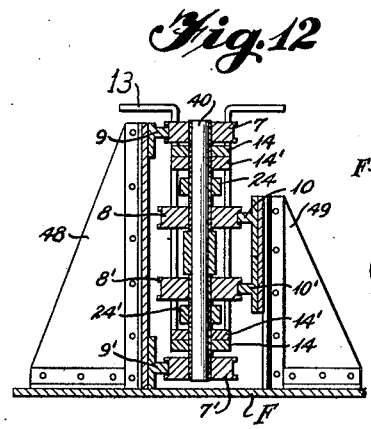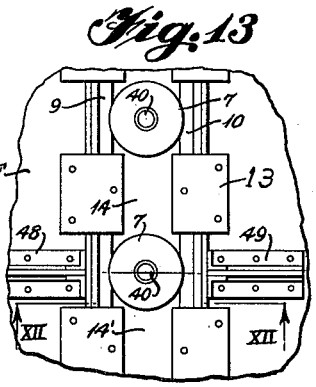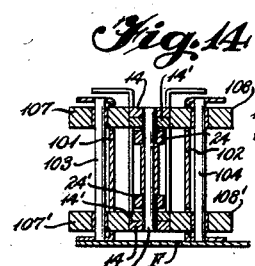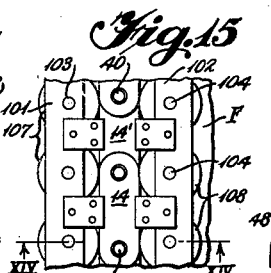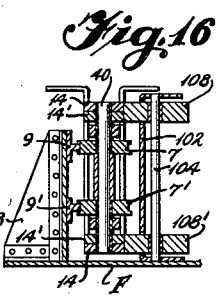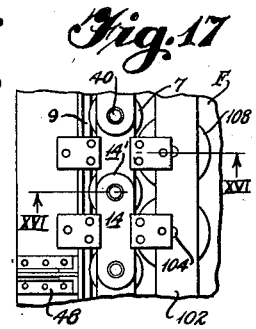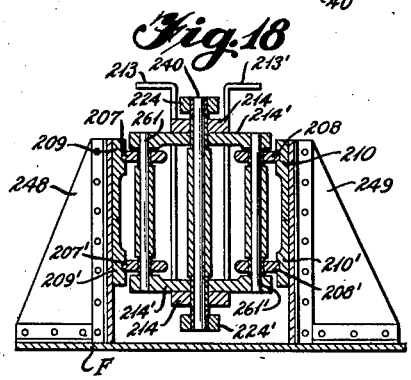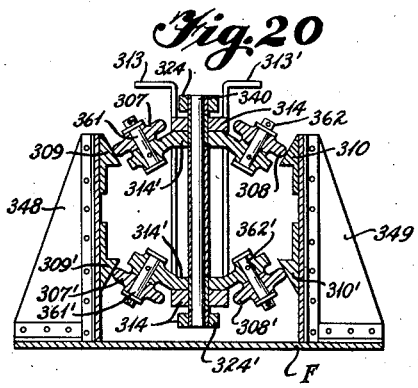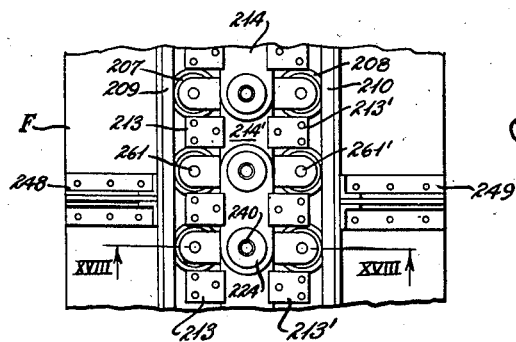

April 2, 1957  G. J. SYKOKIS  2,787,366
ENDLESS CHAIN CONVEYOR
Filed March 2, 1950  6 Sheets-Sheet 4
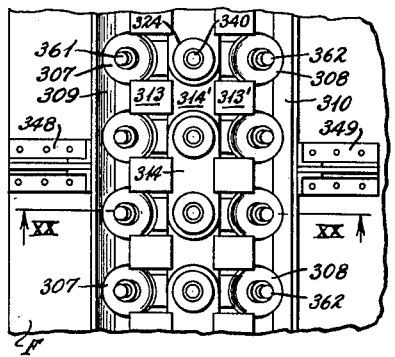
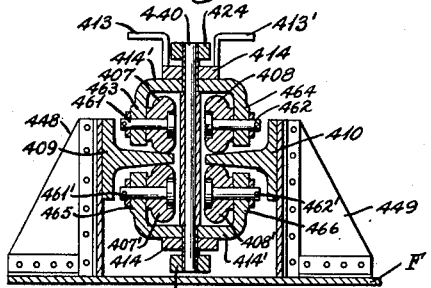
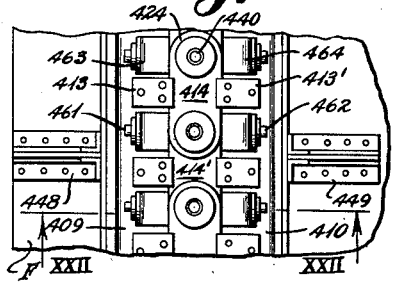
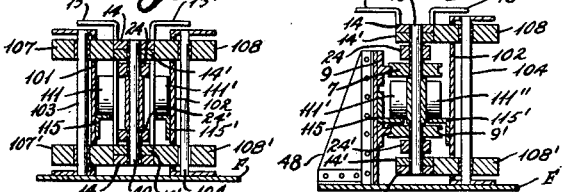
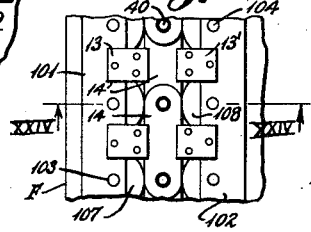
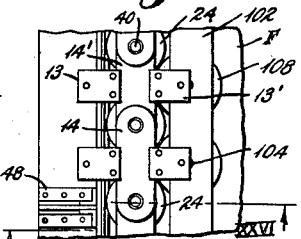
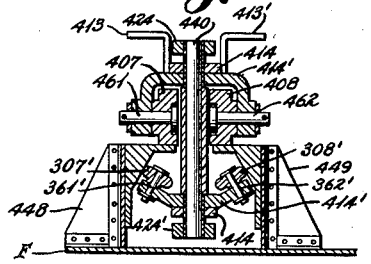
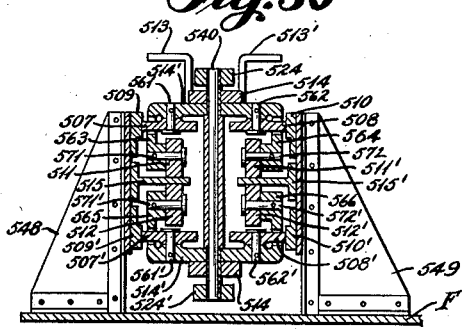
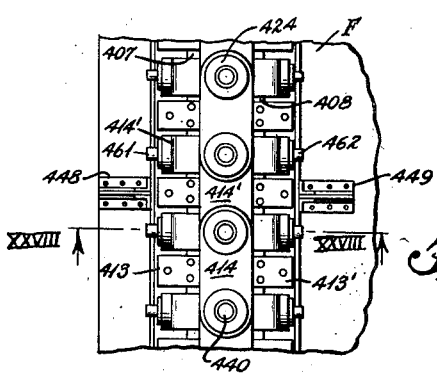

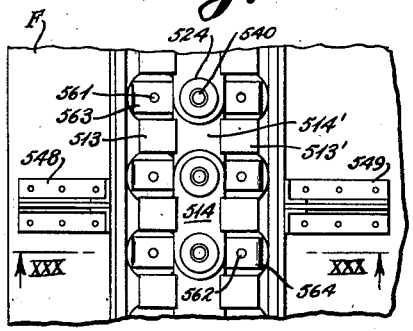
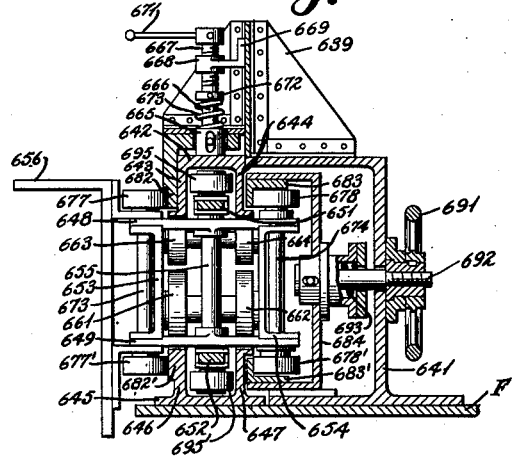
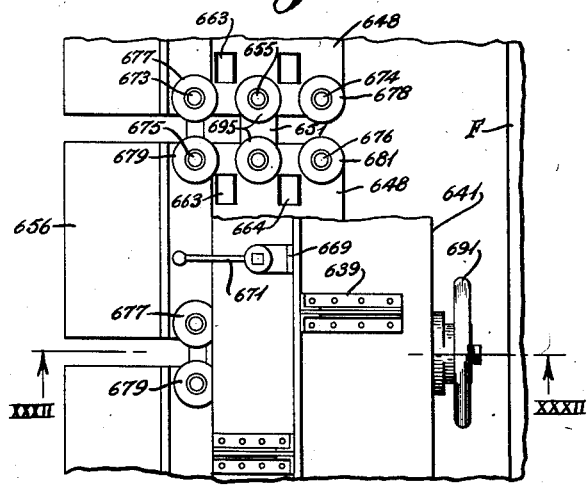
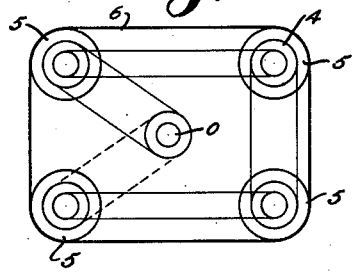
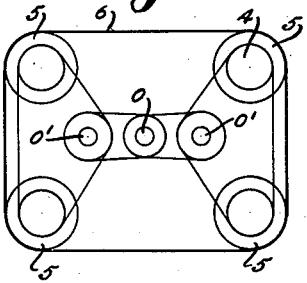
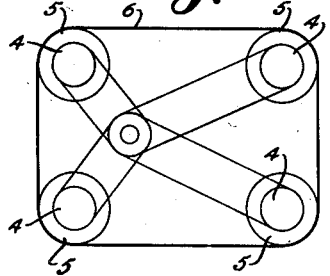
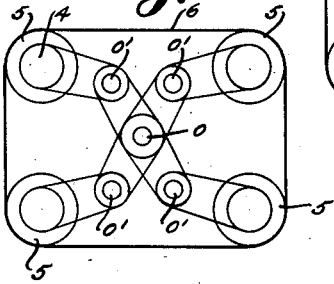

April 2, 1957 G. J. SYKOKIS 2,787,366
ENDLESS CHAIN CONVEYOR
Filed March 2, 1950 6 Sheets-Sheet 6

United States Patent Office 2,787,366
Patented Apr. 2, 1957

2,787,366

ENDLESS CHAIN CONVEYOR

George J. Sykokis, Athens, Greece

Application March 2, 1950, Serial No. 147,225

21 Claims. (Cl. 198—137)

This invention relates to chain conveyors and particularly concerns improvements in the structural parts of the conveyor chain with its cooperating track and guide rails to provide a precision conveyor for carrying articles along a predetermined path without material lateral deviation.

This application is a continuation-in-part of my pending application Serial No. 51,438, filed September 27, 1948, for Combined Conveyors of Continuous Motion.

A major object of the invention is to provide an improved chain conveyor which moves along a predetermined path and is confined against lateral deviations from that path for the purpose of consistently carrying articles along a predetermined path so they may, for example, be operated upon by a machine tool with a uniform result. A further object of the invention is to provide a chain conveyor construction which will, with precision, move articles in direct line and curved line paths and carry such articles through the entire length of the conveyor.

In the attainment of these objects, one important feature of the invention resides in the provision of a conveyor chain having pivotally connected links with a frame defining a path for the chain and rollers and guide rail elements cooperating to confine the chain during its movement throughout substantially its entire length and thereby minimize lateral deviations of the chain from a predetermined path. More particularly, the invention resides in the arrangement of the rollers and guide rails so their points of contact lie on opposite sides of a plane passing through the pivot pins of the chain and on opposite sides of a plane normal to said pivot pins so the rollers on opposite sides of at least one of those planes rotate in opposite directions as the chain moves relative to the conveyor.

As will become apparent from the following detailed description, conveyors embodying this concept may be divided roughly into two categories, namely, those in which the rollers are carried by the chain and those in which the rollers are disposed on the frame beside the chain. A third category is the combination of the two where the rollers at one side are carried by the chain and the rollers at the other side of the path are carried by the frame for the conveyor.

In the category where the rollers are carried by the chain, we again divide into two major groups, first those where the rollers are disposed on brackets at opposite sides of the pivot pins, and second those where the rollers are rotatably mounted on the pivot pins.

In its preferred form, the conveyor chain has two sets of pivotally connected links arranged parallel and in spaced relation with common pivot pins. These links and pivot pins may have supporting wheels engaging tracks carried by the conveyor frame for supporting the chain in the predetermined path. Then, guide wheels and guide rails are so arranged that their points of contact lie on opposite sides of a plane passing through the pivot pins and on opposite sides of a plane passing through the axes of the supporting wheels.

All of these features are directed toward a reduction of disturbing forces in the conveyor chain which may lead to vibration or disturbance of the chain in its movement along a predetermined path. Thus, the parts of the conveyor chain are preferably so arranged that the forces developed during movement of the chain, as by rotation of the wheels and engagement of the wheels with the guide rails or the guide rail elements, are materially reduced from those developed in conveyors now in use. This is accomplished by the arrangement of equalizing forces to guide and support the conveyor chain. It is enhanced by the particular arrangement of the conveyor guide wheels so they rotate in opposite directions and neutralize the forces developed by their counterparts.

Other objects, advantages and features of the invention will become apparent from the following specification taken in conjunction with the accompanying drawings, wherein Fig. 1 is a top plan view of a conveyor embodying one form of the invention;

Fig. 2 is a fragmentary side elevational view of the conveyor chain incorporated in the conveyor shown in Fig. 1;

Fig. 3 is a fragmentary sectional view taken on the line III—III of Fig. 2 showing the conveyor chain links with a greater clarity;

Fig. 4 is a side elevational view of the conveyor chain links shown in Figs. 2 and 3;

Fig. 5 is a transverse sectional view of the conveyor taken on the line V—V of Fig. 1;

Fig. 6 is another transverse sectional view taken on the line VI—VI of Fig. 1;

Fig. 7 is a transverse sectional view through the conveyor chain and its driving sprocket taken on the line VII—VII of Fig. 1.

Fig. 8 is a transverse sectional view, similar to Fig. 5, of a slightly modified form of the invention;

Fig. 9 is a transverse sectional view, similar to Fig. 6, of a slightly modified form of the invention;

Fig. 10 is a fragmentary sectional view taken on line X—X of Figure 11, showing an arrangement which may be incorporated in the driving mechanism shown in Fig. 7 to properly orient the conveyor chain driving sprockets with respect to the chain driving sprocket;

Fig. 11 is a plan view of the device shown in Fig. 10;

Fig. 12 is a transverse sectional view taken on line XII—XII of Figure 13, similar to Fig. 5, of a modified form of the invention;

Fig. 13 is a top plan view of the modified form as shown in Fig. 12;

Fig. 14 is a transverse sectional view taken on line XIC—XIV of Figure 15, showing another modified form of the invention;

Fig. 15 is a top plan view of the modification shown in Fig. 14;

Fig. 16 is a transverse sectional view taken on line XVI—XVI of Figure 17, showing still another modified form of the invention;

Fig. 17 is a top plan view of the modification shown in Fig. 16;

Fig. 18 is a transverse sectional view taken on line XVIII—XVIII of Figure 19, showing another modified form of the invention where the guide wheels are supported at the sides of conveyor pivot pins;

Fig. 19 is a top plan view of the modification shown in Fig. 18;

Fig. 20 is a transverse sectional view taken on line XX—XX of Figure 21, showing a modification of the arrangement shown in Fig. 18;

Fig. 21 is a top plan view of the modification shown in Fig. 20;

Fig. 22 is a transverse sectional view taken on line XXII—XXII of Figure 23, showing a modified form of the invention where the supporting wheels have counterparts arranged beneath the supporting tracks;

Fig. 23 is a top plan view of the arrangement shown in Fig. 22;

Fig. 24 is a transverse sectional view taken on line XXIV—XXIV of Figure 25, similar to the modification shown in Figure 14 but including conveyor supporting wheels;

Fig. 25 is a top plan view of the modification shown in Fig. 24;

Fig. 26 is a transverse sectional view taken on line XXVI—XXVI of Figure 27, showing a further modification where the guide rollers and guide rails are partially arranged on the chain and partially on the conveyor frame;

Fig. 27 is a top plan view of the modification shown in Fig. 26;

Fig. 28 is a transverse sectional view taken on line XXVIII—XXVIII of Figure 29, showing still a further modification of the arrangement shown in Fig. 22;

Fig. 29 is a top plan view of the modification shown in Fig. 28;

Figure 1:
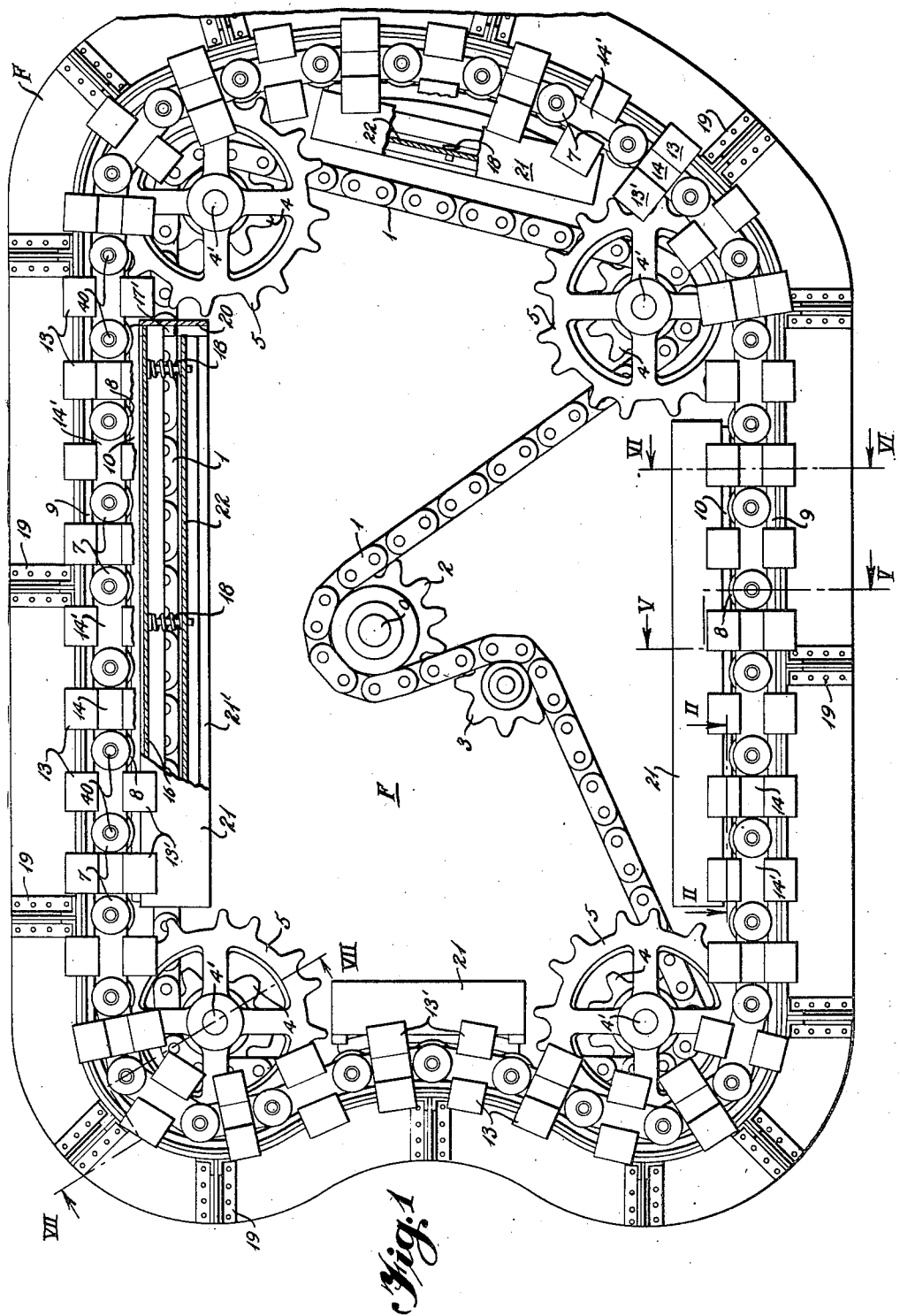
Figure 38:
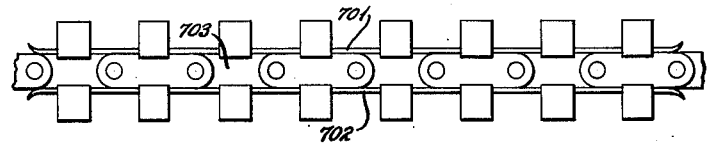
Figure 39:
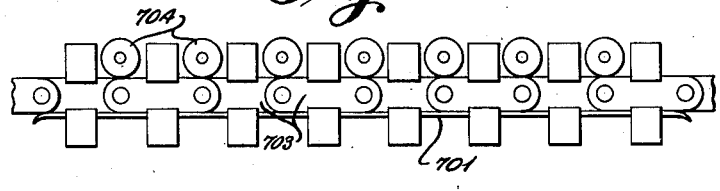
Figure 40:
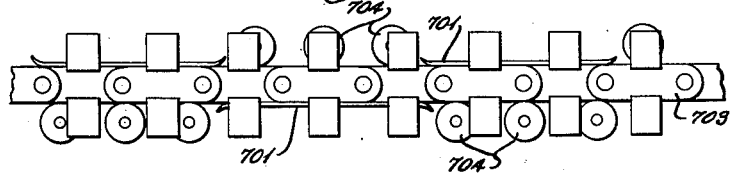
Figure 41:
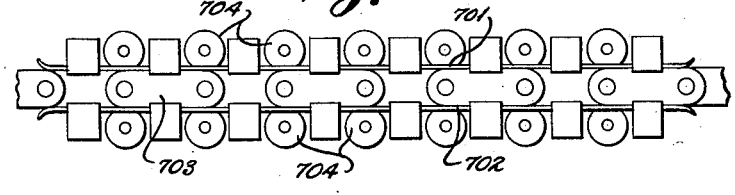

Fig. 30 is a transverse sectional view taken on line XXX—XXX of Figure 31, showing a further modification of the conveyor where the supporting wheels are arranged on brackets extending laterally from the pivot pin for the conveyor chain links and have counterparts arranged beneath the supporting track with guide wheels and cooperating guide rails at the sides of the pivot pins for the conveyor chain;

Fig. 31 is a top plan view of the modification shown in Fig. 30;

Fig. 32 is a transverse sectional view taken on line XXXII—XXXII of Figure 33, showing still a further modified arrangement of a conveyor chain together with devices for adjusting the positions of the tracks and rails for the chain;

Fig. 33 is a top plan view of the modification shown in Fig. 32;

Fig. 34 is a schematic view of a modified arrangement of the driving mechanism shown in Fig. 1;

Fig. 35 is a similar view of another modification of the driving mechanism;

Fig. 36 is a similar view of another modification of the driving mechanism;

Fig. 37 is still a similar view of another modification of the driving mechanism;

Fig. 38 is a top diagrammatic view of a modification of the conveyor in which the guide rollers are substituted by sliding elements on both sides of the conveyor;

Fig. 39 is a similar view in which the guide rollers are substituted on only one side of the conveyor;

Fig. 40 is a diagrammatic view of a conveyor in which the sides of the conveyor are provided with guide rollers and sliding elements; and Fig. 41 is a diagrammatic view of a conveyor in which guide rollers and sliding elements are used concurrently.

Referring now to the accompanying drawings, there is illustrated in Fig. 1, a conveyor having a power chain 1 driven by a driving sprocket 2 splined on a motor shaft 0 and serving as the power for the entire conveyor system. Engaging chain 1 is a take-up sprocket 3 for the purpose of controlling the tension on the chain in a manner well known in the art. In addition to passing around driving sprocket 2 and take-up sprocket 3, driving chain 1 passes around four driven sprockets 4, 4, arranged on vertical shafts 4'. Also keyed to the vertical shafts 4' are vertically spaced sprockets 5 and 5' (Fig. 7). Thus, driving of chain 1 rotates each of the shafts 4', which may be journaled in any suitable fashion in the frame, and drives the pairs of sprockets 5 and 5' on each of the shafts. Thus, driving power is supplied to various points around the conveyor system in a manner to be described. Variations of this driving system are diagrammatically illustrated in Figs. 34, 35, 36 and 37 and will be described subsequently in this specification. Conveyor chain 6 is composed of two sets of links, 14, 14' having overlapping portions pivotally connected as by pivot pins 40 extending vertically through the entire depth of the conveyor chain. Each pair of vertically aligned links carries a load supporting bracket 13, 13' extending upwardly on opposite sides of the links and having outwardly flanged platform portions for supporting the load.

Defining a path for the conveyor chain is a conveyor frame F having brackets 19 extending upwardly along the outer periphery of the frame and a corresponding frame on the longitudinally extending plates 21, 21' supporting channels 20, 20 at spaced intervals along the conveyor frame. Slideways 17, 17' are supported on the channels 20, 20 defining slidable supports for a channel 16. Supported by the bracket 19 and the channel 16 of the conveyor frame on opposite sides of the chain are chain supporting tracks 15, 15'. Interposed between the two sets of conveyor chain links and carried by the brackets connected to the links is an axle 11 on which are rotatably mounted conveyor supporting wheels 11' and 11". In this way, the two sets of conveyor chain links with the common coupling pivot pins 40 are carried by the supporting wheels 11' and 11" on tracks 15 and 15'.

For the purpose of confining lateral movement of the conveyor chain as it moves along the conveyor frame, guide rails 9, 9' are carried by the bracket 19 and corresponding guide rails 10 and 10' are carried by the channel 16. Rotatably mounted on each of the pivot pins 40 is a set of guide rollers 7 and 7' for engaging the guide rails 9 and 9' on one side of the conveyor frame, and another set of guide rollers 8 and 8' for engaging guide rails 10 and 10' on the other side of the conveyor frame. As will be apparent from an inspection of the drawings, the respective guide rollers and guide rails have points of contact disposed on both sides of a plane through pivot pins 40 and on both sides of a plane normal to the pivot pins. This latter plane, more particularly, may be considered as the plane of the axles 11 for the supporting wheels 11' and 11". With this particular arrangement, the guide rollers 7 and 7' rotate in one direction while the guide rollers 8 and 8' rotate in the opposite direction upon movement of the chain conveyor frame F. Thus, the rollers having points of contact on one side of the plane through the pivot pins rotate in a direction opposite to rollers having points of contact on the other side thereof.

In some instances, it is desirable to provide a predetermined path along which the conveyor chain will travel and in those cases, the two sets of guide rails 9, 9' and 10, 10' are rigidly secured although one of the sets may be adjustable to accommodate variations in the system. In other cases, where it is desirable to maintain as tight a chain as possible, one set of guide rails, as for example rails 10 and 10', may be resiliently urged toward the center of the path along which the conveyor chain travels. In other words, they may be resiliently urged toward the opposite set of guide rails 9 and 9'. To accomplish this, the channel 16 on which the guide rails 10 and 10' are mounted may be resiliently urged along slide 17 and 17' by springs 18 and 18' interposed between the channel 16 and a brace channel 22, mounted in the channels 21 and 21' for that purpose.

From the foregoing description, it is apparent that the conveyor chain has two sets of pivotally connected links, the pins of which extend through the entire depth of the conveyor with guide rollers on the chain arranged to engage guide rails on the conveyor frame at points of contact on opposite sides of a plane through the pivot pins and on opposite sides of a plane normal to the pivot pins. Where the supporting rollers for the conveyor chain are supported on corresponding tracks on the conveyor frame, the points of contact for the guide rollers and guide rails lie on opposite sides of the axis for the supporting wheels.

For the purpose of driving the conveyor chain as already outlined, sprockets 5 and 5' engage rollers 24 and 24' rotatably mounted on each of the pivot pins 40. The manner in which the rollers 24 and 24' are engaged by the sprocket is best illustrated in Fig. 7. As shown in that figure, driving chain 1 rotates sprocket 4 on shaft 4', and this in turn rotates sprockets 5 and 5' on the same shaft. These sprockets respectively engage the rollers 24 and 24' on each of the pivot pins 40. Thus, power is transmitted from the sprockets through the rollers 24 and 24' to the pivot pins 40 and from each of the pivot pins through the connecting links 14, 14' to other elements of the chain. Moreover, the arrangement of several driving sprockets around the conveyor frame provides for uniform application of power to all parts of the chain.

In order to properly synchronize the several driving sprockets 5, 5' at different points on the same conveyor chain, provision may be made for relative adjustment of the positions of the chain sprocket 4 with respect to the conveyor chain sprockets 5 and 5' on each of the shafts 4'. This may be in the form of the device shown in Figs. 10 and 11, where the shaft 4' is divided into two parts 27 to which the chain sprocket 4 is connected and 25 to which the conveyor chain sprockets 5, 5' are connected. Secured to the shaft 25 is a plate 26 which abuts and has sliding contact with a flange 28 on the shaft 27. Plate 26 is provided with a plurality of arcuate slots 29 through which bolts 37 pass and are screwed into tapped holes in the flange 28. Secured, as by bolt 30, to the flange 28 and disposed on top of the plate 26 is a prismatic block 31 arranged to slide in a groove formed in another block 32 slidably mounted in slides 33, 33' on the plate 26. Sliding movement of the block 32 is effected as by bolt 34 turnable in a nut 35 tapped in a bracket extending from the plate 26. With the several bolts loosened, the bolt 34 may be adjusted to adjust the relative positions of the plate 26 and the flange 28 and thereby the relative positions of the two shafts 25 and 27. When a proper orientation between the conveyor chain sprockets 5, 5' and the driving chain sprocket 4 is effected, the several bolts 37 may be tightened to secure the plate 26 in fixed position relative to the flange 28 and thereby have a positive drive between the driving chain 1 and the sprockets 5, 5' for the conveyor chain.

In connection with the driving mechanism, another feature may be noticed in the form of guide rail elements 45 and 46 for respectively engaging the guide rollers 8 and 8' and supporting rail elements 47 for engaging supporting wheel 11''. Thus, not only during movement along the conveyor frame is the conveyor chain laterally confined to a predetermined path, but even during movement around the sprockets, the same contact between the guide rollers and guide rails is effected. This adds to the insurance of the precision with which the conveyor chain moves along a defined path without lateral deviation from that path.

In Figs. 8 and 9, the conveyor track and conveyor chain are substantially the same as those indicated in Figs. 5 and 6 except for the particular arrangement of the supports for the guide rails and the mounting for the load supporting bracket 13. As shown in these figures, guide rail 9 is supported from a bracket 42 depending from an arm 43 extending over the top of the conveyor chain, and rail 9' is supported on a bracket 44 also mounted on the conveyor frame F. The purpose of this arrangement is to permit the load supporting bracket 13 to extend from the side of the conveyor chain and a load may be carried by these brackets in any suitable manner.

In some applications, it is not necessary that the chain be supported by the wheels 11' and 11'' on tracks 15 and 15'. For example, where relatively light loads are involved, but a high precision of movement along the path is required, a conveyor may be used such as illustrated in Fig. 12. As is apparent from an inspection of that figure, guide wheels 7, 7' and 8, 8' are provided with concave peripheries for respectively engaging the guide rails 9, 9' and 10, 10'. The grooves are such that the guide wheels support the pivot pins 40 and the links 14, 14' of the chain without other rolling support. Thus, the conveyor chain is not only confined against lateral movement by the points of contact of the guide rollers and guide rails on opposite sides of a plane passing through the pivot pins and on opposite sides of a plane normal to the pivot pins, but these same points of contact actually support the conveyor in the frame. Of course, in this application, both sides of the conveyor frame supporting the pairs of guide rails must be quite rigid to prevent lateral shifting of the conveyor during its movement along the conveyor frame path. As illustrated in Figs. 12 and 13, the conveyor frame path includes side brackets 48 and 49 respectively supporting guide rails 9, 9' and 10, 10'.

In the foregoing illustrations, the invention is shown embodied in the conveyor chain where the guide rollers and guide rails have points of contact on opposite sides of a plane passing through the pivot pins and on opposite sides of a plane normal to the pivot pins and preferably bisecting the pivot pins. This same basic arrangement may be attained in a structure such as that illustrated in Figs. 14 and 15 where the guide rail elements and the guide rollers are reversed. Thus, as shown in Figs. 14 and 15, conveyor track frame F has longitudinally extending side members 101 and 102 in which are mounted axles 103 and 104 respectively. The conveyor chain is composed of links 14, 14' arranged in two sets both pivotally connected by common pivot pins 40 extending the entire depth of the conveyor chain. Also on these pivot pins are arranged sprocket engaging rollers 24 and 24' held in spaced relationship by a suitable spacer in the form of a sleeve surrounding the pin. Rotatably mounted on the axles 103 and 104 are guide rollers 107, 107' and 108, 108' for engaging the top and bottom sets of the conveyor chain links 14, 14'. As will be observed, the sides of the links form guide rail elements for each link in the chain and respectively engage guide roller elements supported by the conveyor frame. As in the case of the previously described arrangement, the guide rollers and guide rail elements have points of contact arranged on opposite sides of the plane through the pivot pins 40 and on opposite sides of a plane normal to the pivot pins 40. This provides a neutralized force arrangement because the guide rollers rotate in opposite directions as the conveyor chain moves along the conveyor frame. Particularly where the plane normal to the pivot pins bisects those pivot pins, we have a substantially symmetrical arrangement of the guiding and supporting devices for the conveyor chain.

In the particular form shown in Figs. 14 and 15, the conveyor chain is supported by the guide rollers and the use of bearing or supporting wheels is not required. Where heavier loads may be used, the same structure may be adopted but with the addition of supporting wheels as illustrated in Figs. 24 and 25. Thus, longitudinal frame members 101 and 102 may carry supporting tracks 115, 115' for engaging supporting wheels 111, 111' journaled on the conveyor chain links in the same manner as the wheels 11', 11'' in Fig. 6. With this arrangement, the guide rail elements on the chain and the guide rollers on the conveyor frame have points of contact lying on opposite sides of a plane through the conveyor chain pivot pins 40 and on opposite sides of a plane through the axis of rotation of the supporting wheels 111' and 111''.

In certain specialized instances, a combination of the conveyors shown in Figs. 12 and 14 may be desirable where the guide rails on one side of the conveyor frame engage guide rollers on the conveyor chain and guide rollers on the other side of the frame engage guide rail elements on the conveyor chain. Such a type of conveyor is illustrated in Figs. 16 and 17, where conveyor frame F has on one side a supporting bracket 48 carrying guide rails 9, 9' and on the other side a longitudinally extending member 102 supporting axle 104 on which are rotatably mounted guide rollers 108 and 108'. Guide rollers 7 and 7' on the conveyor chain pivot pin 40 engage guide rails 9 and 9', whereas guide rollers 108 and 108' engage the guide rail elements formed by the side edges of links 14 and 14' in the two sets of conveyor links forming the chain and coupled together by the conveyor pivot pins 40. Here again, the points of contact between the guide rollers and guide rail elements lie on opposite sides of a plane through the conveyor pins 40 and on opposite sides of a plane normal to those conveyor pins even though that particular arrangement differs from that previously described.

An arrangement similar to that shown in Figs. 16 and 17 is found in Figs. 26 and 27 except that supporting wheels 111' and 111'' engage supporting rails 115 on bracket 48 and a similar supporting rail 115' on longitudinal frame member 102. In this particular form of the invention as in those previously described, the points of contact of the guide rollers with the guide rail elements are arranged on opposite sides of a plane through the conveyor pivot pins and on opposite sides of a plane through the axes of rotation of the supporting wheels 111' and 111''.

In the forms of the invention heretofore discussed, either the guide rollers have been mounted on the pivot pins 40 or the guide rollers have been on the conveyor frame to engage the links of the conveyor chain which are in turn connected to the pivot pins 40. Where an even more symmetrical arrangement is desired, the four guide rollers may be supported on axles parallel to the pivot pins of the conveyor. For example, as illustrated in Figs. 18 and 19, links 214' at the upper and lower portions of pivot pins 240 have laterally extending arms which support axles 261 and 261' in substantially parallel relation to the pivot pin 240. Rotatably mounted on axle 261 are guide rollers 207, 207'. Rotatably mounted on axle 261' are guide rollers 208, 208'.

For the purpose of engaging these four guide wheels to prevent lateral movement and also to support the conveyor chain in the conveyor frame work F, side brackets 248 and 249 respectively carry guide rails 209, 209' and 210, 210' disposed on opposite sides of the conveyor chain. As shown in the drawing, Fig. 13, the guide rails are provided with longitudinally extending grooves to receive the convex peripheries of the guide wheels on the conveyor chain and thereby support the conveyor chain.

Although this particular form of the invention does not include supporting wheels, it will be observed that light loads are adequately supported by the cooperation of the guide rollers and the guide rails. As in the case of the previous forms of the invention, the guide rollers and guide rails have points of contact arranged on opposite sides of a plane through the conveyor pins 240 and on opposite sides of a plane normal to those pins, the last named plane preferably bisecting the pins.

In the form of the invention shown in Figs. 20 and 21, the general arrangement is similar to that shown in Figs. 18 and 19, but the guide rollers and guide rails are angularly disposed with respect to the axes of the pivot pins of the conveyor chain. However, their points of contact are still arranged in the same manner on opposite sides of the plane through the pivot pins and on opposite sides of the plane normal to the pivot pins. As illustrated in Figs. 20 and 21, conveyor frame F has uprights 348 and 349 which carry longitudinally extending guide rails 309, 309' and 310, 310'. The surfaces of these guide rails are inclined with respect to the vertical, thus guide rails 309, 309' have their respective surfaces inclined in opposite directions. Rail 309 extends upwardly and outwardly from the center of the conveyor path and 309' extends downwardly and outwardly. Rails 310, 310' are similarly arranged.

Conveyor chain has corresponding links 314 and 314' connected by pivot pins 340 carrying rollers 324 and 324' for engagement with the sprockets to drive the chain. Links 314' carry load supporting brackets 313 and also have laterally extending arms for supporting the guide rollers. As shown best in Fig. 20, the arms of the chain links 314' extend angularly with respect to the horizontal. Thus, on one side of the conveyor chain the arms are inclined toward one another and on the other side they are oppositely inclined toward one another. These arms carry axles 361 and 361' on one side of the conveyor chain and axle 362, 362' on the other side of the conveyor chain. Guide rollers 307, 307' are carried by the axle 361, 361' to engage guide rails 309, 309'. Similarly, guide rollers 308, 308' are carried by axles 362, 362' to engage the inclined surfaces of guide rails 310, 310'. With the four guide rollers and guide rails inclined angularly with respect to the conveyor chain, the conveyor chain is confined in all directions except the direction of its path of movement. In addition to confining lateral deviation of the conveyor chain from a predetermined path, the angular inclination of the guide rollers and guide rails also confines deviation of the conveyor chain in a vertical direction. This confinement of the conveyor chain is accomplished by reason of the arrangement of the points of contact of the angularly disposed guide rollers and guide rails on opposite sides of a plane through the pivot pins and on opposite sides of a plane normal to the pivot pins.

Another arrangement where the rollers perform both a supporting and a guiding function is found in Fig. 22, where the conveyor frame F has uprights 448 and 449 respectively supporting rails 409 and 410, the upper and lower faces of which converge toward the center of the conveyor path. The conveyor chain has upper and lower sets of links 414 and 414' pivotally connected together by pivot pins 440 which also carry sprocket engaging rollers 424 and 424'. Links 414 support the load supporting brackets 413 and links 414' have downwardly extending arms 463 and 464 respectively supporting axles 461 and 462 on which are rotatably mounted guide wheels 407 and 408. Similarly, the lower link 414' has upwardly extending arms 465 and 466 which respectively carry axles 461' and 462' to support rollers 407' and 408'. The rollers respectively engage the upper and lower inclined faces of the rails 409 and 410. Due to the converging sloping surfaces of the rails, the conveyor is confined against lateral movement of its path by the engagement above and below each of the rails of the respective rollers carried by the conveyor chain. Here again, the points of contact between the rollers and the rails are on opposite sides of a plane through the pivot pins 440 and on opposite sides of a plane normal to the pivot pins. Moreover, the latter plane is through the median line of the rails.

A modified arrangement is shown in Fig. 28 where the upper part of the conveyor chain corresponds to that shown in Fig. 22 and the lower part corresponds to that shown in Fig. 20. The rails have flat upper surfaces and inclined lower surfaces. Corresponding numerals appear on the respective figures of the drawings.

Where heavier loads are involved, an arrangement such as that illustrated in Figs. 30 and 31 may be employed in the conveyor and also provides a heavier support for the conveyor chain on supporting rails and wheels with provision for confinement of the chain in a vertical direction as well as a transverse direction. Conveyor frame F has spaced uprights 548 and 549 arranged on opposite sides of the path for the conveyor chain. These uprights carry longitudinally extending guide rails 509, 509' and 510, 510' also arranged on opposite sides of the path to the conveyor. Also, the uprights carry, between the guide rails on the respective sides of the conveyor, supporting or bearing tracks 515, 515', having upper and lower surfaces arranged to engage bearing wheels and retaining wheels in a manner to be described.

The conveyor chain in this form of the invention has, as in the other conveyor chains, a spaced pair of sets of chain links. The upper set has links 514, 514' and the lower set corresponding links 514, 514'. Both sets of links are connected by common pivot pin 540 extending the entire depth of the conveyor chain. At the outer extremities of this pivot pin, there are arranged sprocket engaging rollers 524, 524' by which the chain is driven along its path. Conveyor chain links 514' have laterally extending rams from which depend brackets 563 and 564 on the upper set of links, and 565, 566 on the lower set of links, the latter set projecting upwardly from the lower part of the chain. Carried by the outwardly extending arms are axles 561, 561', 562 and 562' for carrying guide rollers 507, 507', 508 and 508'. These guide rollers are arranged to rotate about a vertical axis arranged on opposite sides of the plane through the pivot pins 540 and also at the top and bottom of the conveyor chain. Guide roller 507 engages guide rail 509 in the upper left corner of the conveyor chain, guide roller 507' engages guide rail 509' in the lower left corner; guide roller 508 engages guide rail 510 in the upper right corner, and guide roller 508' engages guide rail 510' in the lower right corner. Thus, as in the case of the conveyor shown in Fig. 18, the guide rollers and guide rails are so arranged that they have points of contact on opposite sides of a plane through the conveyor pins 540 and on opposite sides of a plane normal to those pivot pins. This provides a symmetrical arrangement for confining the conveyor chain against lateral movement from its predetermined path along the conveyor frame.

For purposes of supporting the conveyor chain, supporting wheels 511, 511' and retaining wheels 512, 512' are arranged to engage respectively the upper and lower surfaces of the supporting tracks 515, 515'. The supporting wheels are carried by the arms extending from the links 514' toward the central portion of the conveyor chain. Axles 571, 571' and 572, 572' for the respective wheels are disposed horizontally substantially parallel to the supporting tracks 515, 515'. With the particular arrangement illustrated, the supporting wheels not only support the conveyor chain on the horizontal supporting tracks, but the lower set of wheels cooperate with the supporting wheels to retain the conveyor chain against movement from its predetermined path in a vertical direction. With this arrangement, the only direction in which the conveyor chain is free to move is the direction of its path along the conveyor frame. Like the guide rollers, the supporting wheels and their cooperating retaining wheels beneath the supporting tracks are arranged to contact the rails at the points on opposite sides of a plane through the coupling pins for the conveyor chain and on opposite sides of a plane normal to those coupling pins. In the case of both the guide rollers and the supporting and retaining wheels, the points of contact are on opposite sides of the plane normal to the conveyor chain pins which passes through the rails 515, 515'. It will also be observed that, like the arrangement shown in Figs. 5 and 6, the points of contact for the guide rollers are on opposite sides of a plane through the axes of rotation of the supporting wheels, which plane is normal to the pivot pins. It will be observed that the brackets for carrying the rollers and wheels have apertures in their sides through which the guide rollers project to engage the respective guide rails.

In the form of the invention illustrated in Figs. 30 and 31, the guide rollers and the supporting and retaining wheels are mounted on axles extending inwardly from the brackets supporting them on the conveyor chain. Thus, all of the rotating parts are contained within the conveyor chain assembly as distinguished from an arrangement with rollers and/or wheels projecting outwardly from the chain. A converse arrangement is illustrated in Figs. 32 and 33, where the same result is achieved by having the rollers and wheels externally exposed to engage the guide rails and tracks of the conveyor frame. This arrangement permits certain adjustments of the tracks and rails and also enables the load supporting bracket to be carried on one side of the conveyor chain.

As illustrated in Figs. 32 and 33, conveyor frame F is provided with an upright 641 on which is mounted a bracket 639, adjustably supporting an upper rail member 642 from which extend retaining rails 643 and 644. Carried on the base of the frame work is another rail member 645 from which upwardly project rails 646 and 647. The conveyor chain comprises a plurality of links, each of which has upper and lower plates 648 and 649 pivotally coupled together by links 651 and 652 through which a common pivot pin 655 projects at each side of each link. Rigidly securing the link plates 648 and 649 together are a pair of side channels 653 and 654. Secured to one side of the link is a load supporting bracket 656 which extends outwardly beyond the side of the link and has a horizontal surface for carrying a load. Rotatably mounted at both ends of each link are a pair of supporting wheels 661 and 662, which are provided with an axle extending transversely of the link below its horizontal center. These wheels extend downwardly through apertures in the plate 649 to engage supporting rails 646 and 647 and thereby support the conveyor chain links on the supporting rails of the conveyor chain. Similarly, retaining wheels 663 and 664 are likewise rotatably mounted on axles journaled in the side members 653 and 654. These retaining wheels project upwardly through apertures in plates 648 to engage retaining tracks 643 and 644.

For purposes of adjusting the position of the retaining tracks to determine the spacing between the tracks for accommodating the particular links and their wheels, track member 642 is adjustably mounted by a collar 665 slidable on a stub shaft 666 having a threaded end 667 in nut 668. Nut 668 is mounted by a bracket 669 on the member 639 above the conveyor frame work. A handle 671 on the threaded end of the shaft 666 adjusts the position of that shaft and thereby adjusts the position of a collar 672. A spring 673 is interposed between the collar 672 and the collar 665 to resiliently urge the track member 642 toward the conveyor chain. Adjustment of the handle 671 varies the compressive force of the spring 673 exerted on the track member 642.

Four shafts 673, 674, 675 and 676 are mounted in the links at the four corners of the plates 648 and 649 to rotatably support guide wheels, 677, 678, 679, 681, 677', 678', 679' and 681'. The guide wheels 677 and 679 and 677' and 679' respectively engage the guide rails 682 and 682' carried by the conveyor frame work at the left-hand side as illustrated in Fig. 32. Corresponding guide rails are carried by the conveyor frame on the other side of the conveyor path for engaging the guide wheels 681 and 681'. However, the particular cross section of Fig. 32 is taken through an adjustment mechanism where guide rails 683 and 683' are supported in a slidable channel member 684 which is adjustable transversely of the conveyor path by an adjustable mechanism controlled by hand wheel 691 which shifts a threaded shaft 692 laterally to vary the compression exerted by a spring 693 on the face of the channel member 684, and thereby control the pressure applied by the guide rails to the interior of the guide wheels on each link of the conveyor chain.

In addition to the structure already described, carried by the pivot pins 655 at both ends of each link are sprocket engaging rollers 695 and 695' for engaging a specially shaped sprocket not shown in the drawings.

With the conveyor arrangement illustrated in Figs. 32 and 33, the conveyor chain is not only confined to the path of the conveyor frame by contact of the guide rollers and guide rails on opposite sides of planes through the pivot pins and normal to the pivot pins, but is confined by the corresponding contact of the supporting and retaining rollers with the supporting and retaining tracks. Moreover, the arrangement of guide rollers and guide rails at the four corners of the individual links provides points of contact at opposite sides of a plane normal to the aforementioned planes, that is, a transverse plane through the center of each link. The arrangements for changing the pressure exerted by the rails and tracks on the rollers and wheels of the conveyor chain may be adopted to the other forms of conveyor frames and conveyor chains described in the specification and illustrated in other figures of the drawings.

In Fig. 38, there is illustrated a conveyor chain provided with double sliding guides 701 and 702 arranged to engage opposite sides of the links of a conveyor chain 703. In Fig. 39, guide rollers 704, 704 engage one side of the chain 703 while the same slide 701 engages the other side. In the case of Fig. 40, the guide rollers 704 and guides 701 engage opposite sides of the conveyor chain alternately, whereas in Fig. 41, both guide rollers and sliding guides are utilized.

Illustrated diagrammatically in Figs. 34, 35, 36 and 37 are different arrangements for supplying power to the shafts 4' at the four corners of the conveyor. Thus, power from the motor shaft 0 is transmitted by one or more chains and possibly through countershafts and intermediate chains to sprockets on each of the driving shafts for the conveyor chain. Correspondingly, the conveyor chain sprockets on these driving shafts are all driven in the same direction at a uniform speed and with approximately the same application of power. In all cases, orientation may be effected by the adjustable arrangement illustrated in Figs. 10 and 11.

As many changes may be made in details of construction, the embodiments of the invention described in the foregoing specification and shown in the accompanying drawings are intended to be illustrative and are not to be construed in a limiting sense. What I claim as my invention and desire to secure by Letters Patent is defined in the following claims.

I claim:

1. A conveyor comprising an articulated endless chain having links pivotally coupled by pivot pins, a conveyor track frame defining a precisely predetermined path for said chain, and a plurality of longitudinally spaced sets of cooperating rollers and guide rails on said chain and said track frame, each of said sets including rollers engaging rails at points of contact on opposite sides of a plane through said pins and on opposite sides of a plane normal to said pins confining said chain against lateral deviation from said path.

2. A conveyor comprising an articulated endless chain having links pivotally coupled by pivot pins, a conveyor track frame defining a precisely predetermined path for said chain, and cooperating rollers and guide rails on said chain and said track frame in engagement at points of contact on opposite sides of a plane through said pins and on opposite sides of a plane normal to said pins to counteract transverse components of forces on said chain, said rollers and guide rails being so arranged that rollers on opposite sides of one of said planes rotate in opposite directions upon movement of said chain relative to said frame and to confine said chain against lateral deviation from said path.

3. A conveyor comprising an articulated endless chain having a spaced pair of courses of links pivotally coupled by common pivot pins, a conveyor track frame defining a precisely predetermined path for said chain, and cooperating rollers and guide rails on said chain and said track frame in engagement at points of contact on opposite sides of a plane through said pins and on opposite sides of a plane normal to said pins between said courses of links to counteract transverse components of forces on said chain and confine said chain against lateral deviation from said path.

4. A conveyor comprising an articulated endless chain having links pivotally coupled by pivot pins, a conveyor track frame defining a path for said chain, and four sets of cooperating rollers and guide rails on said chain and said track frame, two of said sets of cooperating rollers and guide rails having points of contact on one side of a plane through said pins with the other two sets having points of contact on the other side of said plane, and two different of said sets of cooperating rollers and guide rails having points of contact on one side of a plane normal to said pins with the remaining two sets having points of contact on the other side of said normal plane.

5. A conveyor comprising an articulated endless chain having links pivotally coupled by pivot pins, a conveyor track frame defining a precisely predetermined path for said chain, cooperating roller elements and guide elements on said chain and said track frame, the elements on said chain being arranged in contact with elements on said frame on opposite sides of a plane through said pins and on opposite sides of a plane normal to said pins to counteract transverse components of forces on said chain and confine said chain against lateral deviation from said path.

6. A conveyor comprising an articulated endless chain having links pivotally coupled by pivot pins, a conveyor track frame defining a precisely predetermined path for said chain, cooperating roller elements and guide elements on said chain and said track frame, the elements on said chain being arranged in engagement with the elements on said frame on opposite sides of a plane through said pins and on opposite sides of a plane normal to said pins to counteract transverse components of forces on said chain, the roller elements on one side of one of said planes being arranged to rotate in a direction opposite to the direction of rotation of the roller elements on the other side of said one plane upon relative movement of said chain and said track frame.

7. A conveyor comprising an articulated endless chain having links pivotally coupled by pivot pins, a conveyor track frame defining a path for said chain, four sets of cooperating roller elements and guide elements on said chain and said track frame, pairs of said sets of elements being arranged on opposite sides of a plane through said pins, and different pairs of said sets of elements being arranged on opposite sides of a plane normal to said pins.

8. A conveyor comprising an articulated endless chain having links pivotally coupled by pivot pins, a conveyor frame defining a precisely predetermined path for said chain, cooperating wheel elements and track elements supporting said chain on said frame, and cooperating roller elements and guide elements restraining lateral movement of said chain relative to said frame, said roller elements and guide elements being in engagement at points of contact on opposite sides of a plane through said pins and on opposite sides of a plane normal to said pins.

9. A conveyor comprising an articulated endless chain having links pivotally coupled by pivot pins, guide rollers on said chain, a conveyor track frame defining a precisely predetermined path for said chain, guide rails on said track frame engaging said rollers at points of contact at opposite sides of a plane through said pins and at opposite sides of a plane normal to said pins counteracting transverse components of forces on said chain and restraining said chain against lateral deviation from said path.

10. A conveyor comprising an articulated endless chain having links pivotally coupled by pivot pins, a conveyor track frame defining a precisely predetermined path for said chain, a plurality of guide rails mounted on said frame, brackets extending from said chain on opposite sides of said pins, guide rollers carried by said brackets in engagement with said rails, said rollers and guide rails being so arranged that their points of contact lie on opposite sides of a plane through said pins and on opposite sides of a plane normal to said pins counteracting transverse components of forces on said chain and restraining said chain against lateral deviation from said path.

11. A conveyor comprising an articulated endless chain having links pivotally coupled by pivot pins, a conveyor track frame defining a precisely predetermined path for said chain, pairs of angularly disposed guide rails on opposite sides of said frame, brackets extending laterally from said chain on opposite sides of said pins, angularly disposed rollers carried by said brackets in engagement with said rails for supporting said chain on said frame, said rollers and rails being so arranged that their points of contact lie on opposite sides of a plane through said pins and on opposite sides of a plane normal to said pins restraining said chain against lateral deviation from said path.

12. A conveyor comprising an articulated endless chain having links pivotally coupled by pivot pins, a conveyor frame defining a path for said chain, tracks extending along said frame, wheels on said chain for engaging said track to support said chain thereon, guide rails on said track extending parallel to said track, guide rollers associated with each pin on said chain engaging said guide rails, said guide rollers and guide rails being so arranged that their points of contact lie on opposite sides of a plane through said pins and on opposite sides of a plane normal to said pins restraining said chain against lateral deviation from said path.

13. A conveyor comprising an articulated endless chain having links pivotally coupled by pivot pins, a conveyor frame defining a precisely predetermined path for said chain, tracks extending along said frame, wheels on said chain for engaging said tracks to support the chain on said frame, a plurality of brackets extending laterally from said chain on opposite sides of said pins, guide rails disposed along said frame parallel to said tracks, and guide rollers carried by said brackets engaging said guide rails and confining lateral movements of said chain relative to said frame, said guide rollers and guide rails being arranged so their points of contact are on opposite sides of a plane through said pins and on opposite sides of a plane normal to said pins, the rollers on opposite sides of one of said planes being arranged to rotate in opposite directions upon relative movement of said chain and said frame.

14. A conveyor comprising an articulated endless chain having links pivotally coupled by pivot pins, a conveyor frame defining a precisely predetermined path for said chain, tracks extending along said frame, wheels on said chain engaging said tracks to support and retain the chain on said frame, said wheels and tracks having points of contact on opposite sides of a plane through said pins and on opposite sides of a plane normal to said pins, guide rails extending along said frame parallel to said tracks, and guide rollers on said chain engaging said guide rails to confine lateral movements of said chain relative to said frame, said guide rollers and guide rails being so arranged that their points of contact lie on opposite sides of said plane normal to said pins.

15. A conveyor comprising an articulated endless chain having links pivotally coupled by pivot pins, a conveyor frame defining a precisely predetermined path for said chain, tracks extending along said chain, supporting wheels on said chain engaging said tracks to support and retain said chain on said frame, said wheels and tracks being so arranged that their points of contact lie on opposite sides of a plane through said pins and on opposite sides of a plane normal to said pins, brackets carried by said chain extending laterally from said pins, guide rollers supported by said brackets, guide rails extending along said frame parallel to said tracks for engaging said rollers, said guide rollers engaging said guide rails at points of contact on opposite sides of a plane through said pins and on opposite sides of a plane normal to said pins.

16. A conveyor comprising an articulated endless chain having links pivotally coupled by pivot pins, a conveyor frame defining a path for said chain, pairs of guide rails extending along said frame on opposite sides thereof, and pairs of rollers rotatable on said pins engaging the guide rails on opposite sides of said track in a manner such that the points of contact of said rollers and rails lie on opposite sides of a plane through said pins and on opposite sides of a plane normal to said pins, the rollers and guide rails being arranged in a manner such that rollers on one side of one of said planes rotate in a direction opposite to rollers on the other side of said one plane.

17. A conveyor comprising an articulated endless chain having links pivotally coupled by pivot pins, a conveyor frame defining a path for said chain, tracks extending along said frame, supporting wheels carried by said chain for engaging said tracks to support said chain on said frame, guide rails extending along said frame parallel to said tracks on opposite sides of said frame, four guide rollers rotatable on said pins engaging different ones of said guide rails, said rollers and guide rails being so arranged that their points of contact lie on opposite sides of a plane through said pins and on opposite sides of a plane normal to said pins, the rollers on one side of one of said planes rotating in opposite direction to the rollers on the other side of said one plane upon relative movement of said chain and said frame.

18. A conveyor comprising an articulated endless chain having links pivotally coupled by pivot pins, a conveyor track frame defining a path for said chain, four sets of rollers carried by said frame in lines parallel to the path of movement of said chain, corresponding guide rail elements on said chain engaging the respective sets of rollers, said sets of rollers and rail elements being so arranged that their points of contact lie on opposite sides of a plane through said pins and on opposite sides of a plane normal to said pins, the rollers on one side of one of said planes being arranged to rotate in a direction opposite to the rollers on the other side of said one plane.

19. A conveyor comprising an articulated endless chain having links pivotally coupled by pivot pins, a conveyor frame defining a path for said chain, tracks extending longitudinally of said path, supporting wheels on said chain for engaging said tracks to support said chain on said frame, four sets of guide rollers carried by said frame in lines parallel to said tracks, four corresponding sets of guide rail elements carried by said chain engaging the respective sets of rollers, said elements and rollers being so arranged that their points of contact lie on opposite sides of a plane through said pins and on opposite sides of a plane normal to said pins, the rollers being so arranged that those on one side of one of said planes rotate in a direction opposite to the rollers on the other side of one plane.

20. A conveyor comprising an articulated endless chain having links pivotally coupled by pivot pins, a conveyor frame defining a path for said chain, a pair of guide rails extending longitudinally along said frame, a pair of sets of guide rollers on said chain engaging said guide rails, a second pair of sets of guide rollers extending along said frame, and a second set of guide rail elements on said chain engaging said second pair of sets of guide rollers, said rollers and guide rails being so arranged that their points of contact lie on opposite sides of a plane through said pins and on opposite sides of a plane normal to said pins restraining lateral deviation of said chain from said path.

21. A conveyor comprising an articulated endless chain having links pivotally coupled by pivot pins, a conveyor frame defining a precisely predetermined path for said chain, tracks extending longitudinally along said frame, wheels on said chain engaging said tracks to support said chain on said frame, a pair of guide rails extending along said frame parallel to said tracks, a pair of sets of guide rollers extending along said frame parallel to said tracks, guide rollers on said chain engaging the guide rails on said tracks, and guide rails on said chain engaging the guide rollers on said tracks, said rollers and rails being so arranged that their points of contact lie on opposite sides of a plane through said pins and on opposite sides of a plane normal to said pins restraining lateral deviation of said chain from said path.

References Cited in the file of this patent

UNITED STATES PATENTS

| | | |
|---|---|---|
| 452,791 | Jackman | May 26, 1891 |
| 747,090 | Schmidt et al. | Dec. 15, 1903 |
| 851,701 | Spear | Apr. 30, 1907 |
| 1,279,579 | Perkins | Sept. 24, 1918 |
| 1,319,122 | Shelton | Oct. 21, 1919 |
| 1,631,124 | Hall | June 7, 1927 |
| 1,817,970 | Da Costa | Aug. 11, 1931 |
| 1,871,054 | Hartley | Aug. 9, 1932 |
| 2,309,587 | Hassler | Jan. 26, 1943 |
| 2,526,563 | Keen | Oct. 17, 1950 |

FOREIGN PATENTS

| | | |
|---|---|---|
| 19,840/29 | Australia | May 2, 1929 |
| 624,474 | Great Britain | June 9, 1949 |